United States Patent
Murui et al.

(10) Patent No.: US 12,053,864 B2
(45) Date of Patent: Aug. 6, 2024

(54) ELECTRIC TOOL SYSTEM, METHOD OF USING THE ELECTRIC TOOL SYSTEM, AND PROGRAM

(71) Applicant: Panasonic Intellectual Property Management Co., Ltd., Osaka (JP)

(72) Inventors: Itaru Murui, Nara (JP); Shota Fujii, Osaka (JP); Keita Okamoto, Mie (JP); Naoki Tsujimoto, Mie (JP); Kota Kitamura, Mie (JP); Kotaro Momoeda, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 191 days.

(21) Appl. No.: 17/778,308

(22) PCT Filed: Sep. 18, 2020

(86) PCT No.: PCT/JP2020/035611
§ 371 (c)(1),
(2) Date: May 19, 2022

(87) PCT Pub. No.: WO2021/100309
PCT Pub. Date: May 27, 2021

(65) Prior Publication Data
US 2023/0001549 A1    Jan. 5, 2023

(30) Foreign Application Priority Data
Nov. 22, 2019 (JP) .................. 2019-211834

(51) Int. Cl.
  B25B 23/147  (2006.01)
  B25B 21/02   (2006.01)
  H02P 23/00   (2016.01)

(52) U.S. Cl.
  CPC .......... *B25B 23/1475* (2013.01); *B25B 21/02* (2013.01); *H02P 23/0004* (2013.01)

(58) Field of Classification Search
  CPC ....... B25F 5/00; B25B 23/1475; B25B 21/02; H02P 23/0004; H02P 21/22
  See application file for complete search history.

(56) References Cited

U.S. PATENT DOCUMENTS

2013/0249447 A1   9/2013  Ishii et al.
2016/0325414 A1  11/2016  Mizuno et al.
(Continued)

FOREIGN PATENT DOCUMENTS

| | | |
|---|---|---|
| JP | 2001-037281 A | 2/2001 |
| JP | 2007-282300 A | 10/2007 |

(Continued)

OTHER PUBLICATIONS

International Search Report dated Dec. 8, 2020 issued in International Patent Application No. PCT/JP2020/035611, with English translation.

(Continued)

*Primary Examiner* — Thomas M Wittenschlaeger
(74) *Attorney, Agent, or Firm* — Rimon P.C.

(57) ABSTRACT

An electric tool system includes a motor, a control unit, and an output shaft. The motor includes a stator and a rotor. The control unit performs vector control on the motor. The control unit includes a first acquisition unit, a second acquisition unit, and a command value generation unit. The command value generation unit calculates, based on a torque current acquisition value (current measured value) as a value related to a torque current as acquired by the first acquisition unit and an acceleration acquisition value as a value related to acceleration of the rotor as acquired by the second acquisition unit, at least one of a command value of the (Continued)

torque current to be supplied to the motor or a command value of an excitation current to be supplied to the motor.

11 Claims, 5 Drawing Sheets

(56) References Cited

U.S. PATENT DOCUMENTS

| | | | |
|---|---|---|---|
| 2017/0083014 A1* | 3/2017 | Conrad | ............... B25F 5/00 |
| 2017/0217001 A1 | 8/2017 | Oishi et al. | |
| 2019/0294138 A1 | 9/2019 | Dobashi et al. | |

FOREIGN PATENT DOCUMENTS

| | | | | |
|---|---|---|---|---|
| JP | 2013-201803 A | | 9/2013 | |
| JP | 2017-077099 A | | 4/2017 | |
| JP | 2017077099 A | * | 4/2017 | ............ H02P 5/048 |
| JP | 2017-132021 A | | 8/2017 | |
| WO | 2017/175474 A1 | | 10/2017 | |

OTHER PUBLICATIONS

Extended European Search Report dated Jan. 10, 2023 issued in the corresponding European Patent Application No. 20890148.8.

* cited by examiner

ELECTRIC TOOL SYSTEM, METHOD OF USING THE ELECTRIC TOOL SYSTEM, AND PROGRAM

CROSS-REFERENCE OF RELATED APPLICATIONS

This application is the U.S. National Phase under 35 U.S.C. § 0371 of International Patent Application No. PCT/JP2020/035611, filed on Sep. 18, 2020, which in turn claims the benefit of Japanese Patent Application No. 2019-211834, filed on Nov. 22, 2019, the entire disclosures of which Applications are incorporated by reference herein.

TECHNICAL FIELD

The present disclosure generally relates to an electric tool system, a method of using the electric tool system, and a program. More particularly, the present disclosure relates to an electric tool system including a motor to be subjected to vector control, a method of using such an electric tool system, and a program for carrying out such a method of use.

BACKGROUND ART

Patent Literature 1 discloses an impact rotary tool (electric tool system), which includes a motor, an impact mechanism, an output shaft, a control unit, a trigger switch, and a motor driving unit. The impact mechanism includes a hammer and applies impacting force to the output shaft with the output of the motor. This allows the impact rotary tool to fasten a screw. The control unit gives a drive instruction, corresponding to a manipulative variable of the trigger switch, to the motor driving unit. In accordance with the drive instruction given by the control unit, the motor driving unit regulates voltage applied to the motor, thereby adjusting the number of revolutions of the motor.

CITATION LIST

Patent Literature

Patent Literature 1: JP 2017-132021 A

SUMMARY OF INVENTION

An object of the present disclosure is to provide an electric tool system, a method of using the electric tool system, and a program, all of which contribute to improving the accuracy of control of the motor.

An electric tool system according to an aspect of the present disclosure includes a motor, a control unit, and an output shaft. The motor includes a stator and a rotor. The rotor rotates with respect to the stator. The control unit performs vector control on the motor. The output shaft is to be coupled to a tip tool. The control unit includes a first acquisition unit, a second acquisition unit, and a command value generation unit. The first acquisition unit acquires a value related to a torque current flowing through the motor. The second acquisition unit acquires a value related to acceleration of the rotor. The command value generation unit calculates, based on a torque current acquisition value and an acceleration acquisition value, at least one of a command value of the torque current to be supplied to the motor or a command value of an excitation current to be supplied to the motor. The torque current acquisition value is the value related to the torque current as acquired by the first acquisition unit. The acceleration acquisition value is the value related to the acceleration as acquired by the second acquisition unit.

An electric tool system according to another aspect of the present disclosure includes a motor, a control unit, and an output shaft. The motor includes a stator and a rotor. The rotor rotates with respect to the stator. The control unit performs vector control on the motor. The output shaft is to be coupled to a tip tool. The control unit includes a first acquisition unit, a second acquisition unit, and a correction unit. The first acquisition unit acquires a value related to a torque current flowing through the motor. The second acquisition unit acquires a value related to acceleration of the rotor. The correction unit makes correction to a torque current acquisition value based on an acceleration acquisition value. The torque current acquisition value is the value related to the torque current as acquired by the first acquisition unit. The acceleration acquisition value is the value related to the acceleration as acquired by the second acquisition unit.

A method of using an electric tool system according to still another aspect of the present disclosure is a method of using the electric tool system including a motor, a control unit, and an output shaft. The motor includes a stator and a rotor. The rotor rotates with respect to the stator. The control unit performs vector control on the motor. The output shaft is to be coupled to a tip tool. The method of using the electric tool system includes a first acquisition step, a second acquisition step, and a command value generation step. The first acquisition step includes acquiring a value related to a torque current flowing through the motor. The second acquisition step includes acquiring a value related to acceleration of the rotor. The command value generation step includes calculating, based on a torque current acquisition value and an acceleration acquisition value, at least one of a command value of the torque current to be supplied to the motor or a command value of an excitation current to be supplied to the motor. The torque current acquisition value is the value related to the torque current as acquired in the first acquisition step. The acceleration acquisition value is the value related to the acceleration as acquired in the second acquisition step.

A method of using an electric tool system according to yet another aspect of the present disclosure is a method of using the electric tool system including a motor, a control unit, and an output shaft. The motor includes a stator and a rotor. The rotor rotates with respect to the stator. The control unit performs vector control on the motor. The output shaft is to be coupled to a tip tool. The method of using the electric tool system includes a first acquisition step, a second acquisition step, and a correction step. The first acquisition step includes acquiring a value related to a torque current flowing through the motor. The second acquisition step includes acquiring a value related to acceleration of the rotor. The correction step includes making correction to a torque current acquisition value based on an acceleration acquisition value. The torque current acquisition value is the value related to the torque current as acquired in the first acquisition step. The acceleration acquisition value is the value related to the acceleration as acquired in the second acquisition step.

A program according to yet another aspect of the present disclosure is designed to cause one or more processors to perform the method of using the electric tool system according to one of the previous two aspects.

DESCRIPTION OF EMBODIMENTS

Embodiments of an electric tool system 1 will now be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are schematic representations. That is to say, the ratio of the dimensions (including thicknesses) of respective constituent elements illustrated on the drawings does not always reflect their actual dimensional ratio.

(1) Overview

Figure 1:
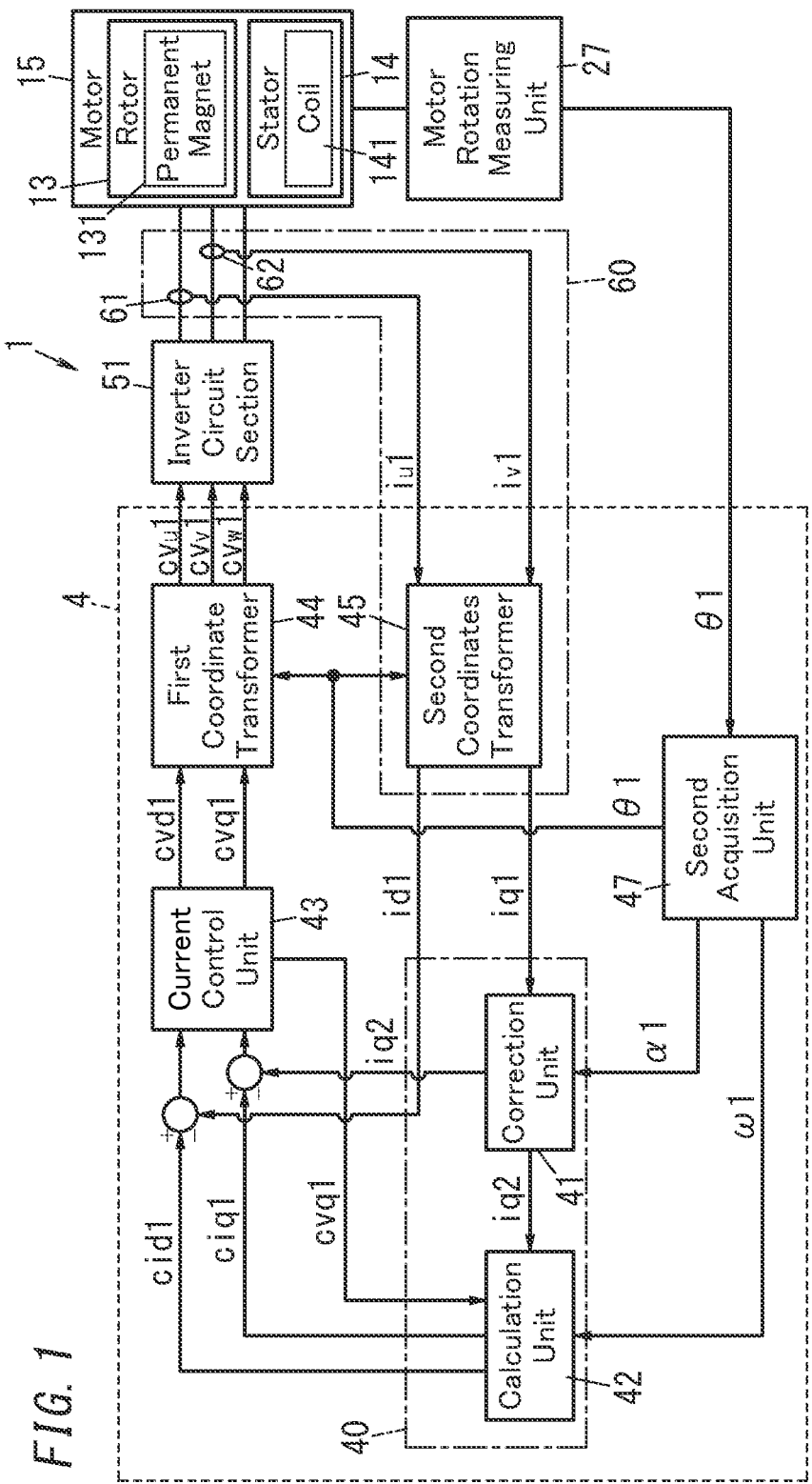
FIG. 1 is a block diagram of an electric tool system according to an exemplary embodiment.
Figure 2:
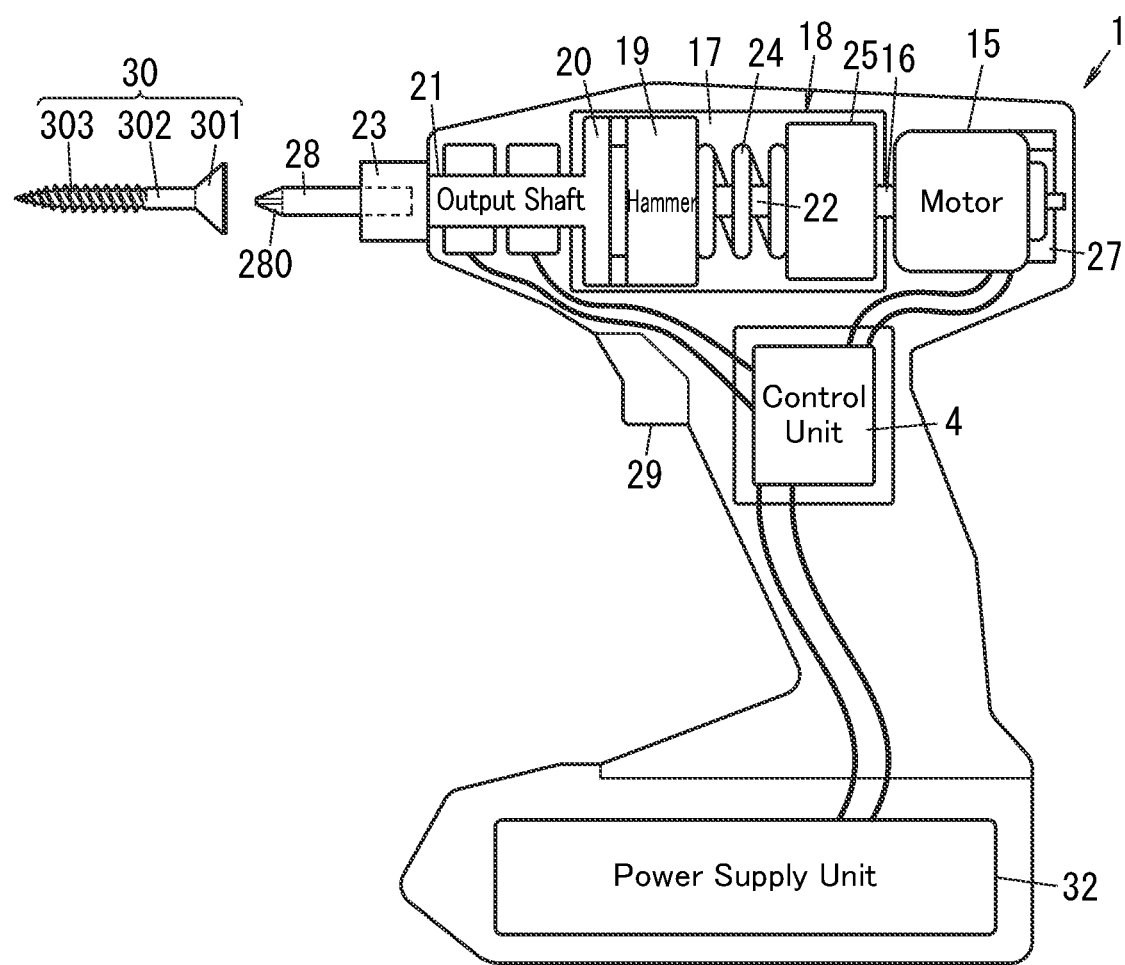
FIG. 2 is a schematic representation of the electric tool system.

As shown in FIGS. 1 and 2, an electric tool system 1 includes a motor 15, a control unit 4, and an output shaft 21. The motor 15 includes a stator 14 and a rotor 13. The rotor 13 rotates with respect to the stator 14. The control unit 4 performs vector control on the motor 15. The output shaft 21 is to be coupled to a tip tool 28. The control unit 4 includes a first acquisition unit 60, a second acquisition unit 47, and a command value generation unit 40. The first acquisition unit 60 acquires a value related to a torque current flowing through the motor 15. The second acquisition unit 47 acquires a value related to acceleration of the rotor 13. The command value generation unit 40 calculates, based on a torque current acquisition value (current measured value iq1) and an acceleration acquisition value α1, at least one of a command value ciq1 of the torque current to be supplied to the motor 15 or a command value cid1 of an excitation current to be supplied to the motor 15. The torque current acquisition value (current measured value iq1) is the value related to the torque current as acquired by the first acquisition unit 60. The acceleration acquisition value α1 is the value related to the acceleration as acquired by the second acquisition unit 47.

This electric tool system 1 enables controlling the motor 15 more accurately, compared to calculating at least one of the command value ciq1 of the torque current or the command value cid1 of the excitation current without using the acceleration acquisition value α1.

The motor 15 may be a brushless motor. In particular, the motor 15 according to this embodiment is a synchronous motor. More specifically, the motor 15 may be a permanent magnet synchronous motor (PMSM). The motor 15 includes a rotor 13 having a permanent magnet 131 and a stator 14 having a coil 141. The rotor 13 includes a rotary shaft 16 which outputs rotational power. The rotor 13 rotates with respect to the stator 14 due to electromagnetic interaction between the coil 141 and the permanent magnet 131.

The vector control is a type of motor control method in which a current supplied to the coil 141 of the motor 15 is broken down into a current component (excitation current) that generates a magnetic flux and a current component (torque current) that generates a torque (rotational power) and in which these current components are controlled independently of each other.

The current measured value iq1 is used to perform the vector control and calculate at least one of the command values ciq1, cid1. This allows a part of a circuit for performing the vector control and a part of a circuit for calculating at least one of the command values ciq1, cid1 to be shared. This contributes to reducing the areas and dimensions of circuits provided for the electric tool system 1 and cutting down the cost required for the circuits.

In addition, in the electric tool system 1 according to this embodiment, the control unit 4 includes the first acquisition unit 60, the second acquisition unit 47, and a correction unit 41. The correction unit 41 makes correction to the torque current acquisition value (current measured value iq1) based on the acceleration acquisition value α1. The torque current acquisition value (current measured value iq1) is a value related to a torque current as acquired by the first acquisition unit 60. The acceleration acquisition value α1 is a value related to acceleration as acquired by the second acquisition unit 47.

This electric tool system 1 enables controlling the motor 15 more accurately, compared to a situation where the correction unit 41 makes no correction to the current measured value iq1.

(2) Electric Tool System

The electric tool system 1 according to this embodiment is an impact tool with an impact mechanism 17 (see FIG. 2) for applying impacting force to the output shaft 21. The electric tool system 1 may be used as, for example, an impact screwdriver, a hammer drill, an impact drill, an impact drill-screwdriver, or an impact wrench. In the following description of an exemplary embodiment, a situation where the electric tool system 1 is used as an impact screwdriver for fastening a screw will be described as a typical application. However, the electric tool system 1 does not have to be implemented as an impact tool. That is to say, the impact mechanism 17 is not an essential constituent element for the electric tool system 1. Alternatively, the electric tool system 1 may also be used as an electric saw, plane, nibbler, hole saw, or grinder. for example.

As shown in FIG. 2, the electric tool system 1 includes a power supply unit 32, the motor 15, a motor rotation measuring unit 27, a transmission mechanism 18, the output shaft 21, a socket 23, and the tip tool 28. In addition, the electric tool system 1 further includes a trigger switch 29 and the control unit 4. The motive power of the motor 15 is transmitted to the output shaft 21. More specifically, the transmission mechanism 18 transmits the motive power of the motor 15 to the output shaft 21.

The output shaft 21 is a part that rotates upon receiving the driving force transmitted from the motor 15 via the transmission mechanism 18. The socket 23 is fixed to the output shaft 21. The tip tool 28 is attached removably to the socket 23. The tip tool 28 rotates along with the output shaft 21. The electric tool system 1 is designed to rotate the tip tool 28 by turning the output shaft 21 with the driving force applied by the motor 15. That is to say, the electric tool system 1 is a tool for driving the tip tool 28 with the driving force applied by the motor 15. The tip tool 28 (also called a "bit") may be a screwdriver bit or a drill bit, for example. One of various types of tip tools 28 is selected depending on the intended use and attached to the socket 23 for the intended use. Alternatively, the tip tool 28 may be directly attached to the output shaft 21.

The electric tool system 1 according to this embodiment includes the socket 23, thus making the tip tool 28 replaceable depending on the intended use. However, the tip tool 28 does not have to be replaceable. Alternatively, the electric tool system 1 may also be designed to allow the use of only a particular type of tip tool 28, for example.

The tip tool 28 according to this embodiment is a screwdriver bit for tightening or loosening a fastening member 30 (screw). More specifically, the tip tool 28 is a plus screwdriver bit, of which a tip portion 280 is formed in a + (plus) shape. That is to say, the output shaft 21 holds the screwdriver bit for tightening or loosening a screw and rotates upon receiving motive power from the motor 15. In the following description, a situation where the screw is tightened by the electric tool system 1 will be described as an example. Note that any type of screw may be used without limitation. The screw may be a bolt, a screw, or a nut, for example.

The fastening member 30 includes a head portion 301, a cylindrical portion 302, and a thread portion 303. The head portion 301 is connected to a first end of the cylindrical portion 302. The thread portion 303 is connected to a second end of the cylindrical portion 302. The head portion 301 has a screw hole (such as a plus (+) hole) that fits the tip tool 28. The thread portion 303 has a thread thereon.

The tip tool 28 fits the fastening member 30. That is to say, the tip tool 28 is inserted into the screw hole on the head portion 301 of the fastening member 30. In this state, the tip tool 28 is caused to rotate by being driven by the motor 15, thereby turning the fastening member 30. That is to say, the tip tool 28 applies tightening (or loosening) force to the fastening member 30.

The power supply unit 32 supplies a current for driving the motor 15. The power supply unit 32 may be a battery pack, for example. The power supply unit 32 may include, for example, either a single secondary battery or a plurality of secondary batteries.

The transmission mechanism 18 includes a planetary gear mechanism 25, a drive shaft 22, and the impact mechanism 17. The transmission mechanism 18 transmits the rotational power of the rotary shaft 16 of the motor 15 to the output shaft 21. More specifically, the transmission mechanism 18 regulates the rotational power of the rotary shaft 16 of the motor 15 and outputs the rotational power thus regulated as the rotational power of the output shaft 21.

The rotary shaft 16 of the motor 15 is connected to the planetary gear mechanism 25. The drive shaft 22 is connected to the planetary gear mechanism 25 and the impact mechanism 17. The planetary gear mechanism 25 reduces the rotational power of the rotary shaft 16 of the motor 15 at a predetermined reduction ratio and outputs the rotational power thus reduced as the rotational power of the drive shaft 22.

The impact mechanism 17 is coupled to the output shaft 21. The impact mechanism 17 transmits the rotational power (of the rotary shaft 16) of the motor 15, which has been received via the planetary gear mechanism 25 and the drive shaft 22, to the output shaft 21. In addition, the impact mechanism 17 also performs an impact operation of applying impacting force to the output shaft 21.

The impact mechanism 17 includes a hammer 19, an anvil 20, and a spring 24. The hammer 19 is attached to the drive shaft 22 via a cam mechanism. The anvil 20 is in contact with, and rotates along with, the hammer 19. The spring 24 biases the hammer 19 toward the anvil 20. The anvil 20 is formed integrally with the output shaft 21. Alternatively, the anvil 20 may also be formed separately from, and be fixed to, the output shaft 21.

Unless a load (torque) with a predetermined magnitude or more is applied to the output shaft 21, the impact mechanism 17 causes the output shaft 21 to turn continuously with the rotational power of the motor 15. That is to say, in that case, the drive shaft 22 and the hammer 19 that are coupled to each other via the cam mechanism rotate along with each other and the hammer 19 and the anvil 20 also rotate with each other. Thus, the output shaft 21 formed integrally with the anvil 20 rotates.

On the other hand, upon the application of a load with a predetermined magnitude or more to the output shaft 21, the impact mechanism 17 performs an impact operation. In performing the impact operation, the impact mechanism 17 generates impacting force by transforming the rotational power of the motor 15 into pulses of torque. That is to say, while the impact operation is being performed, the hammer 19 retreats by overcoming the biasing force applied by the spring 24 (i.e., goes away from the anvil 20) while being regulated by the cam mechanism between the drive shaft 22 and the hammer 19 itself. At a point in time when the hammer 19 retreats to be decoupled from the anvil 20, the hammer 19 starts advancing (i.e., toward the output shaft 21) while rotating, thereby applying impacting force to the anvil 20 in the rotational direction and causing the output shaft 21 to rotate. That is to say, the impact mechanism 17 applies rotational impact around the axis (output shaft 21) to the output shaft 21 via the anvil 20. While the impact mechanism 17 is performing the impact operation, the hammer 19 repeatedly performs the operation of applying impacting force to the anvil 20 in the rotational direction. Every time the hammer 19 advances and retreats, the impacting force is generated.

The trigger switch 29 is an operating member for accepting the operation of controlling the rotation of the motor 15. The motor 15 may be selectively activated (turned ON or OFF) by the operation of pulling the trigger switch 29. In addition, the rotational velocity of the motor 15 is adjustable depending on the manipulative variable of the operation of pulling the trigger switch 29 (i.e., depending on how deep the trigger switch 29 is pulled). As a result, the rotational velocity of the output shaft 21 is adjustable depending on the manipulative variable of the operation of pulling the trigger switch 29. The greater the manipulative variable is, the higher the rotational velocity of the motor 15 and the output shaft 21 becomes. The control unit 4 either starts or stops rotating the motor 15 and the output shaft 21, and controls the rotational velocity of the motor 15 and the output shaft 21, depending on the manipulative variable of the operation of pulling the trigger switch 29. In this electric tool system 1, the tip tool 28 is coupled to the output shaft 21 via the socket 23. In addition, the rotational velocity of the motor 15 and the output shaft 21 is controlled by operating the trigger switch 29, thereby controlling the rotational velocity of the tip tool 28.

The motor rotation measuring unit 27 measures the rotational angle of the motor 15. As the motor rotation measuring unit 27, a photoelectric encoder or a magnetic encoder may be adopted, for example.

The electric tool system 1 includes an inverter circuit section 51 (see FIG. 1). The inverter circuit section 51 supplies an electric current to the motor 15. The control unit 4 is used along with the inverter circuit section 51 to control the operation of the motor 15 by feedback control.

(3) Control Unit

The control unit 4 includes a computer system including one or more processors and a memory. At least some of the functions of the control unit 4 are performed by making the processor(s) of the computer system execute a program stored in the memory of the computer system. The program may be stored in the memory. The program may also be downloaded via a telecommunications line such as the Internet or distributed after having been stored in a non-transitory storage medium such as a memory card.

As shown in FIG. 1, the control unit 4 includes the command value generation unit 40, a current control unit 43, a first coordinate transformer 44, a second coordinate transformer 45, and the second acquisition unit 47. The electric tool system 1 further includes a plurality of (e.g., two in the example illustrated in FIG. 1) current sensors 61, 62.

Each of the plurality of current sensors 61, 62 includes, for example, a hall element current sensor or a shunt resistor element. The plurality of current sensors 61, 62 measure an electric current supplied from the power supply unit 32 (see FIG. 2) to the motor 15 via the inverter circuit section 51. In this embodiment, three-phase currents (namely, a U-phase current, a V-phase current, and a W-phase current) are supplied to the motor 15. The plurality of current sensors 61, 62 measure currents in at least two phases. In FIG. 1, the current sensor 61 measures the U-phase current to output a current measured value $i_u1$ and the current sensor 62 measures the V-phase current to output a current measured value $i_v1$.

The second acquisition unit 47 obtains a time derivative of the rotational angle $\theta1$ of the (rotor 13 of the) motor 15 as measured by the motor rotation measuring unit 27, thereby calculating an angular velocity $\omega1$ of the rotor 13. In addition, the second acquisition unit 47 also obtains a time derivative of the angular velocity $\omega1$ of the rotor 13, thereby calculating an angular acceleration (acceleration acquisition value $\alpha1$) of the rotor 13. That is to say, the second acquisition unit 47 calculates the acceleration acquisition value $\alpha1$ based on a physical quantity (angular velocity $\omega1$) proportional to the number of revolutions of the rotor 13.

The first acquisition unit 60 includes the two current sensors 61, 62 and the second coordinate transformer 45. The first acquisition unit 60 acquires a d-axis current (excitation current) and a q-axis current (torque current), both of which are to be supplied to the motor 15. That is to say, a current measured value id1 of the d-axis current and a current measured value iq1 of the q-axis current are calculated by having two-phase currents measured by the two current sensors 61, 62 transformed by the second coordinate transformer 45.

The second coordinate transformer 45 performs, based on the rotational angle $\theta1$, measured by the motor rotation measuring unit 27, of the rotor 13, coordinate transformation on the current measured values $i_u1$, $i_v1$ measured by the plurality of current sensors 61, 62, thereby calculating the current measured values id1, iq1. That is to say, the second coordinate transformer 45 transforms the current measured values $i_u1$, $i_v1$, corresponding to currents in three phases, into a current measured value id1 corresponding to a magnetic field component (d-axis current) and a current measured value iq1 corresponding to a torque component (q-axis current), respectively.

The command value generation unit 40 generates (calculates) a command value cid1 of the excitation current and a command value ciq1 of the torque current. The command value cid1 is a command value specifying the magnitude of the excitation current (d-axis current) of the motor 15. That is to say, the control unit 4 controls the operation of the motor 15 to bring the excitation current (d-axis current) to be supplied to the coil 141 of the motor 15 closer toward the command value cid1. The command value ciq1 is a command value specifying the magnitude of a torque current (q-axis current) of the motor 15. That is to say, the control unit 4 controls the operation of the motor 15 to bring the torque current (q-axis current) to be supplied to the coil 141 of the motor 15 closer toward the command value ciq1.

The command value generation unit 40 includes a correction unit 41 and a calculation unit 42. The correction unit 41 corrects the current measured value iq1 (torque current acquisition value) based on the acceleration acquisition value $\alpha1$. The correction unit 41 outputs a corrected torque current iq2 which is a corrected torque current acquisition value. The processing performed by the correction unit 41 to obtain the corrected torque current iq2 by correcting the current measured value iq1 will be described later.

The calculation unit 42 calculates the command value ciq1. The calculation unit 42 calculates, first, a command value of the angular velocity of the rotor 13 based on, for example, the manipulative variable of the operation of pulling the trigger switch 29 (see FIG. 2). That is to say, the greater the manipulative variable is, the more significantly the command value generation unit 40 increases the command value of the angular velocity of the rotor 13. Furthermore, the calculation unit 42 calculates the command value ciq1 to reduce the difference between the command value of the angular velocity of the rotor 13 and the angular velocity $\omega1$ of the rotor 13 as calculated by the second acquisition unit 47. More specifically, the calculation unit 42 calculates the command value ciq1 to reduce the difference to a predetermined threshold value or less.

In addition, the calculation unit 42 also calculates the command value cid1 based on the angular velocity $\omega1$ of the rotor 13, the corrected torque current iq2, and a command value cvq1 (to be described later) generated by the current control unit 43.

In this embodiment, the command value cid1 calculated by the calculation unit 42 is a command value to set the magnitude of the excitation current at zero. The calculation unit 42 may calculate the command value cid1 to set the magnitude of the excitation current at zero constantly or may calculate a command value cid1 to set the magnitude of the excitation current at a value greater or smaller than zero only as needed. If the corrected torque current iq2 is greater than a predetermined value, for example, the calculation unit 42 may increase the command value cid1. Also, if a predetermined condition about the corrected torque current iq2 is satisfied, for example, then the calculation unit 42 may decrease the command value cid1. When the command value cid1 of the excitation current becomes smaller than zero, a negative excitation current (i.e., a flux-weakening current) flows through the motor 15.

The current control unit 43 generates a command value cvd1 based on the difference between the command value cid1 calculated by the calculation unit 42 and the current measured value id1 calculated by the second coordinate transformer 45. The command value cvd1 is a command value that specifies the magnitude of the d-axis voltage of the motor 15. The current control unit 43 determines the command value cvd1 to reduce the difference between the command value cid1 and the current measured value id1. More specifically, the current control unit 43 calculates the command value cvd1 such that the difference becomes equal to or less than a predetermined second threshold value.

In addition, the current control unit 43 also generates a command value cvq1 based on the difference between the command value ciq1 calculated by the calculation unit 42 and the corrected torque current iq2 supplied from the correction unit 41. The command value cvq1 is a command value that specifies the magnitude of the q-axis voltage of the motor 15. The current control unit 43 generates the command value cvq1 to reduce the difference between the command value ciq1 and the corrected torque current iq2. More specifically, the current control unit 43 calculates the command value cvq1 such that the difference becomes equal to or less than a predetermined third threshold value.

The first coordinate transformer 44 performs coordinate transformation on the command values cvd1, cvq1 based on the rotational angle θ1, measured by the motor rotation measuring unit 27, of the motor 15 to calculate command values $cv_u1$, $cv_v1$, $cv_w1$. Specifically, the first coordinate transformer 44 transforms the command value cvd1 for a magnetic field component (d-axis voltage) and the command value cvq1 for a torque component (q-axis voltage) into command values $cv_u1$, $cv_v1$, $cv_w1$ corresponding to voltages in three phases. The command value $cv_u1$ corresponds to a U-phase voltage, the command value $cv_v1$ corresponds to a V-phase voltage, and the command value $cv_w1$ corresponds to a W-phase voltage.

The control unit 4 controls the power to be supplied to the motor 15 by performing pulse width modulation (PWM) control on the inverter circuit section 51. In response, the inverter circuit section 51 supplies voltages in three phases, corresponding to the command values $cv_u1$, $cv_v1$, $cv_w1$, respectively, to the motor 15.

The motor 15 is driven with the power (voltages in three phases) supplied from the inverter circuit section 51, thus generating rotational power.

As a result, the control unit 4 controls the excitation current flowing through the coil 141 of the motor 15 such that the excitation current comes to have a magnitude corresponding to the command value cid1 calculated by the calculation unit 42. In addition, the control unit 4 also controls the torque current flowing through the coil 141 of the motor 15 such that the torque current comes to have a magnitude corresponding to the command value ciq1 calculated by the calculation unit 42.

(4) Correction Processing

The correction unit 41 corrects the current measured value iq1 (torque current acquisition value) based on the acceleration acquisition value α1. Next, exemplary processing performed by the correction unit 41 to correct the current measured value iq1 will be described.

Figure 3:
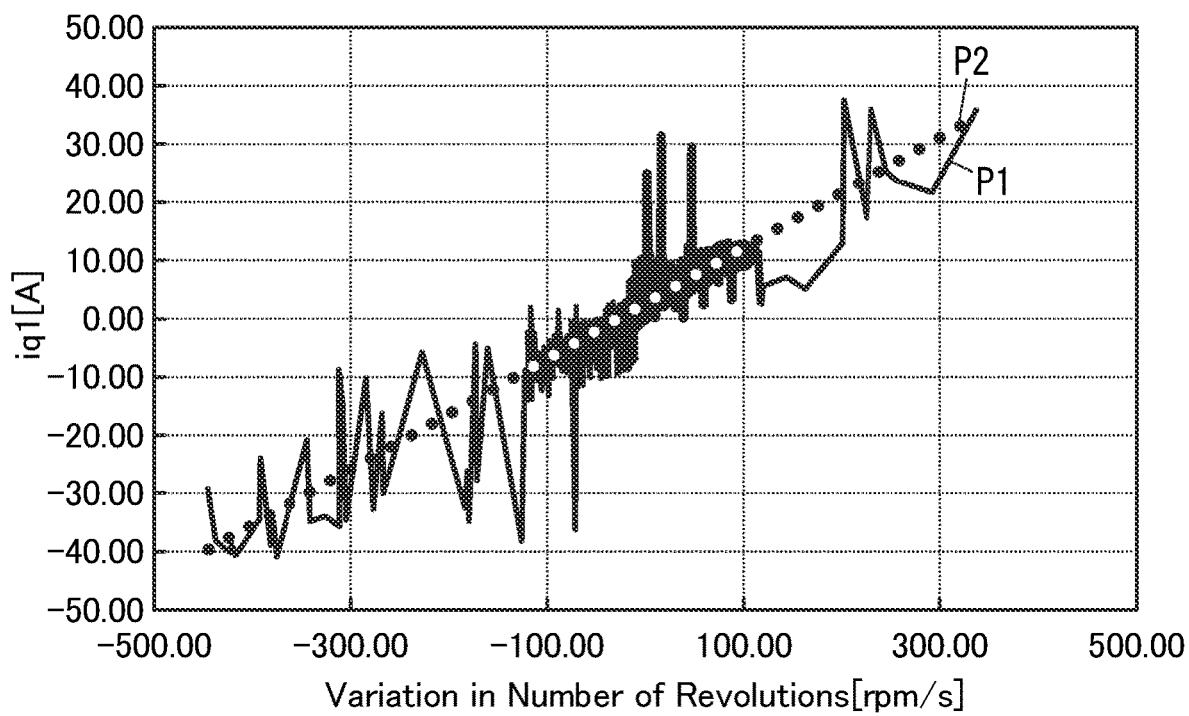
FIG. 3 is a graph showing experimental data collected with respect to the electric tool system.

The polygon P1 shown in FIG. 3 plots actually measured data representing the relationship between the variation per unit time in the number of revolutions of the rotor 13 and the current measured value iq1. Note that the polygon P1 plots the actually measured data obtained when the correction unit 41 does not perform the processing of correcting the current measured value iq1. The designer of the electric tool system 1 obtains the following Equation (1) based on the actually measured data shown in FIG. 3. Equation (1) corresponds to the dotted line P2 shown in FIG. 3. Equation (1) linearly approximates the relationship between the variation per unit time in the number of revolutions of the rotor 13 and the current measured value iq1:

$$y=0.944x+2.4565 \quad \text{Equation (1):}$$

where y is a correction value and x is the variation per unit time (e.g., one second) in the number of revolutions of the rotor 13. The parameter x is equal to the value obtained by dividing the acceleration acquisition value α1 (of which the unit is rad/s$^2$) by 2π.

Any constituent element of the electric tool system 1 manufactured (e.g., a memory of a computer system serving as the control unit 4) memorizes this Equation (1). The correction unit 41 obtains the correction value (y) by Equation (1).

The correction unit 41 obtains the corrected torque current iq2, which is a corrected value of the current measured value iq1, by using not only Equation (1) but also the following Equation (2):

$$iq2=iq1-y \quad \text{Equation (2):}$$

If the number of revolutions of the rotor 13 remains constant, then the current measured value iq1 also remains substantially constant. Meanwhile, as the number of revolutions of the rotor 13 varies, the current measured value iq1 changes according to the variation per unit time in the number of revolutions of the rotor 13 as shown in FIG. 3. This is because the torque current includes not only a current component corresponding to the torque applied to the output shaft 21 but also a current component required to change the number of revolutions of the rotor 13.

As the current measured value iq1 changes according to the variation per unit time in the number of revolutions of the rotor 13, the accuracy of control of the motor 15 may decrease. Thus, to reduce such a change of the current measured value iq1, the correction unit 41 corrects the current measured value iq1 by Equations (1) and (2) and outputs the corrected torque current iq2 as a corrected value. Then, in a state where the correction made by the correction unit 41 is reflected, the calculation unit 42 calculates, based on the corrected torque current iq2 (i.e., corrected torque current acquisition value), at least one of the command value ciq1 of the torque current to be supplied to the motor 15 or the command value cid1 of the excitation current to be supplied to the motor 15. This enables improving the accuracy of control of the motor 15.

(5) Clutch Control

The control unit 4 serves as an electronic clutch for electrically controlling the rotation of the motor 15. The control unit 4 has the function of stopping rotation of the motor 15 depending on a condition as one of the functions as an electronic clutch. In this embodiment, the control unit 4 stops rotating the rotor 13 when finding the corrected torque current iq2 (corrected torque current acquisition value) exceeding the torque current threshold value Th1 (see FIG. 4) in a state where the correction of the current measured value iq1 by the correction unit 41 is reflected. This may reduce the chances of an excessive torque being applied to the output shaft 21. In other words, this may reduce the occurrence of abnormality such as an overload on the electric tool system 1.

Figure 4:
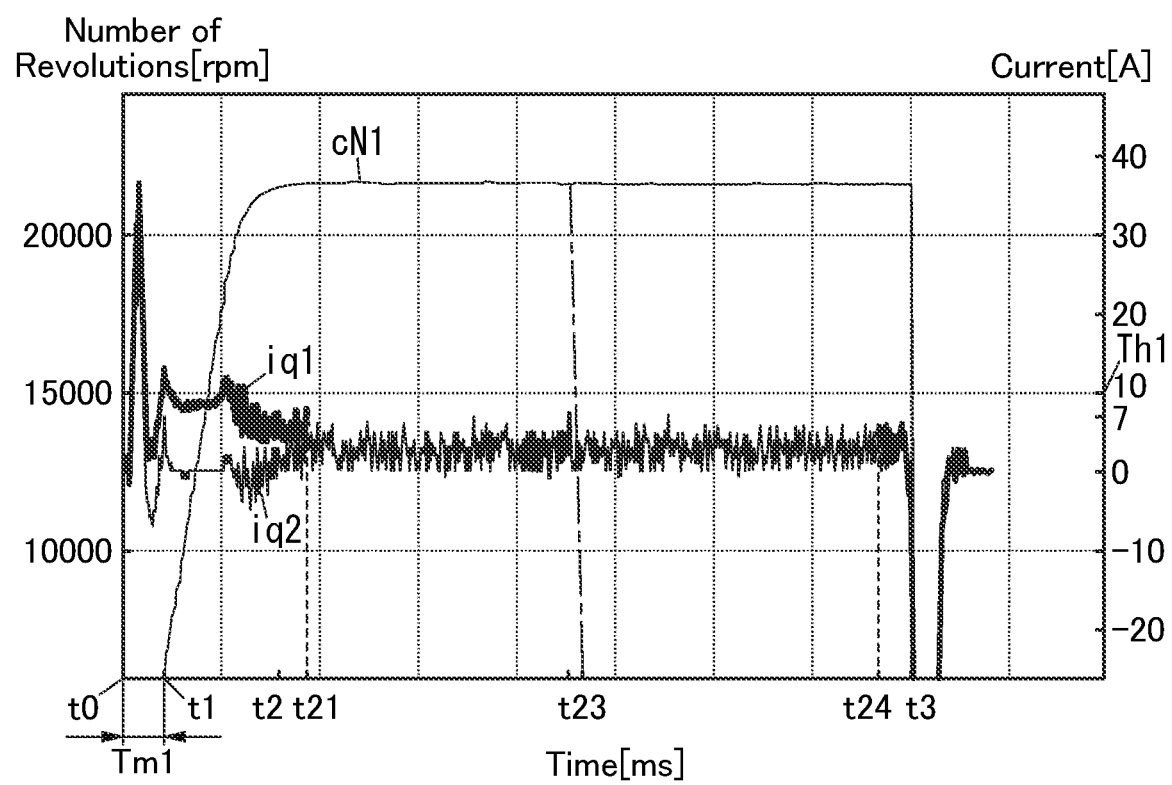
FIG. 4 is a graph showing how the electric tool system may operate.

Nevertheless, the control unit 4 processes, as invalid information for at least a part of the control of the motor 15, the corrected torque current iq2 (corrected torque current acquisition value) in an interval from a point in time when the motor 15 is started (i.e., a point in time when the rotor 13 starts to rotate) through a point in time when a predetermined mask period Tm1 passes. Specifically, even if the corrected torque current iq2 exceeds the torque current threshold value Th1 in the interval from the point in time when the motor 15 is started through the point in time when the predetermined mask period Tm1 passes, the control unit 4 does not stop rotating the rotor 13. This may reduce the chances of the excess of the corrected torque current iq2 over the torque current threshold value Th1 in the mask period Tm1 preventing the motor 15 from being started. In FIG. 4, the mask period Tm1 ends at a point in time t1.

FIG. 4 is a graph showing an exemplary normal operation of the electric tool system 1. In FIG. 4, cN1 denotes a command value of the number of revolutions of the rotor 13. That is to say, the command value cN1 is a value obtained by converting the angular velocity command value of the rotor 13 calculated by the calculation unit 42 into a number of revolutions. Note that in FIG. 4, the current measured value iq1 in the period from a point in time t21 through a point in time t24 is not shown. In that period, the command value cN1 of the number of revolutions of the motor 15 is substantially constant and the number of revolutions N1 remains substantially constant. Thus, in that period, the magnitude of the current measured value iq1 is approximately equal to iq2+2.4565 as can be seen from Equations (1) and (2).

In FIG. 4, the motor 15 starts running at a point in time t0 in accordance with the user's operation of pulling the trigger switch 29. Thereafter, the command value cN1 of the number of revolutions of the rotor 13 continues increasing from no later than the point in time t1 through around a point in time t2. Thus, the number of revolutions of the rotor 13 also continues to increase accordingly.

When finding the corrected torque current iq2 exceeding the torque current threshold value Th1 from the point in time t1 (which is the end point of the mask period Tm1) on, the control unit 4 stop rotating the rotor 13. In FIG. 4, from the point in time t1 on, the corrected torque current iq2 varies in a range short of the torque current threshold value Th1. Thus, the control unit 4 does not stop rotating the rotor 13 until the user stops pulling the trigger switch 29 at a point in time t3. When the user stops pulling the trigger switch 29 at the point in time t3, the command value cN1 decreases to 0 rpm. Thus, the number of revolutions of the rotor 13 also becomes 0 rpm. That is to say, the rotor 13 stops rotating.

In FIG. 4, the torque current threshold value Th1 is 10 A. Suppose, as an example, that the torque current threshold value Th1 is 7 A. In that case, when the corrected torque current iq2 exceeds the torque current threshold value Th1 at a point in time t23, the control unit 4 sets the command value cN1 at 0 rpm as indicated by the one-dot chain in FIG. 4, thereby causing the rotor 13 to stop rotating.

Suppose, as another example, a situation where the control unit 4 stops rotating the rotor 13 when a condition that not the corrected torque current iq2 but the current measured value iq1 exceeds the torque current threshold value Th1 (of 10 A) is satisfied. In that case, in FIG. 4, this condition is satisfied and the control unit 4 stops rotating the rotor 13 in the period from the point in time t1 through the point in time t2. That is to say, even if the electric tool system 1 is performing a normal operation, the control unit 4 may stop rotating the rotor 13 by mistake. Thus, setting the torque current threshold value Th1 at a larger value to prevent the condition described above from being satisfied while the electric tool system 1 is operating normally could make the condition unsatisfied when the electric tool system 1 has some abnormality such as overload.

In contrast, according to this embodiment, the corrected torque current iq2, not the current measured value iq1, is compared with the torque current threshold value Th1. To say the least, from the point in time t1 on, the corrected torque current iq2 increases less significantly than the current measured value iq1 as the number of revolutions of the rotor 13 (command value cN1) increases. Thus, the chances of the corrected torque current iq2 exceeding the torque current threshold value Th1 are slim. Consequently, this may reduce the chances of the control unit 4 stopping rotating the rotor 13 by mistake while the electric tool system 1 is operating normally.

In addition, according to this embodiment, there is no need to reduce an increase in the current measured value iq1 as the number of revolutions of the rotor 13 increases. Thus, there is no need to increase the number of revolutions of the rotor 13 slowly, for example, as a measure for reducing an increase in the current measured value iq1. This allows the number of revolutions of the rotor 13 to be increased quickly, thus contributing to shortening the work time.

(First Variation)

Next, an electric tool system 1 according to a first variation will be described with reference to FIG. 4. In the following description, any constituent element of this first variation, having the same function as a counterpart of the embodiment described above, will be designated by the same reference numeral as that counterpart's, and description thereof will be omitted herein.

In the embodiment described above, the correction unit 41 corrects the current measured value iq1 (torque current acquisition value) based on the acceleration acquisition value α1. On the other hand, according to this first variation, the correction unit 41 corrects the torque current threshold value Th1 based on the acceleration acquisition value α1.

The correction unit 41 corrects the torque current threshold value Th1 by, for example, Equation (1) described for the embodiment and the following Equation (3):

$$Th2 = Th1 + y \qquad \text{Equation (3):}$$

where Th1 is a torque current threshold value that has not been corrected yet, Th2 is a corrected torque current threshold value, and y is the correction value obtained by Equation (1).

The control unit 4 stops rotating the rotor 13 when finding the current measured value iq1 exceeding the corrected torque current threshold value Th2 in a state where the correction made by the correction unit 41 is reflected. In this case, according to this first variation, the value obtained by subtracting the corrected torque current threshold value Th2 from the current measured value iq1 is iq1−Th1−y, as can be seen from Equation (3). In the embodiment described above, the value obtained by subtracting the torque current threshold value Th1 from the corrected torque current iq2 is iq1−Th1−y, as can be seen from Equation (2). Thus, the condition for the control unit 4 to stop rotating the rotor 13 is the same in both the embodiment described above and this first variation.

The correction unit 41 may be allowed to correct both the current measured value iq1 (torque current acquisition value) and the torque current threshold value Th1 by appropriately changing Equations (1), (2), and (3). That is to say, the correction unit 41 only needs to correct at least one of the current measured value iq1 (torque current acquisition value) or the torque current threshold value Th1 based on the acceleration acquisition value α1.

(Second Variation)

Next, an electric tool system 1 according to a second variation will be described with reference to FIG. 4. In the following description, any constituent element of this second variation, having the same function as a counterpart of the embodiment described above, will be designated by the same reference numeral as that counterpart's, and description thereof will be omitted herein.

The command value generation unit 40 (calculation unit 42) according to this second variation calculates, based on the current measured value iq1 (torque current acquisition value) and the acceleration acquisition value α1, at least one of the command value ciq1 of the torque current to be supplied to the motor 15 or the command value cid1 of the excitation current to be supplied to the motor 15 at least in an interval from a point in time when the rotor 13 starts rotating through a point in time when a predetermined period passes. In this case, the predetermined period agrees with the mask period Tm1 according to the embodiment described above. Thus, in the following description, the predetermined period will be hereinafter referred to as a "mask period Tm1." In addition, even after the mask period Tm1 has ended at a point in time t1, the command value generation unit 40 (calculation unit 42) will also calculate, based on the current measured value iq1 (torque current acquisition value) and the acceleration acquisition value α1, at least one of the command value ciq1 of the torque current to be supplied to the motor 15 or the command value cid1 of the excitation current to be supplied to the motor 15.

In this variation, to reduce the chances of the torque current acquisition value exceeding the torque current threshold value Th1 during the mask period Tm1 while the electric tool system 1 is operating normally, the correction unit 41 may perform, for example, the following processing. Specifically, in the mask period Tm1, the correction unit 41 performs first correction processing on the torque current acquisition value (current measured value iq1). In addition, from the end of the mask period Tm1 on, the correction unit 41 performs second correction processing on the torque current acquisition value (current measured value iq1). The second correction processing is the same as, for example, the processing of correcting the current measured value iq1 into the corrected torque current iq2 according to the embodiment described above. In the following description, the first correction processing will be described.

The first correction processing may be, for example, the processing of correcting the current measured value iq1 by a predetermined equation. A specific example of the first correction processing may be the processing of dividing the current measured value iq1 by a predetermined value. The predetermined value is determined in advance based on, for example, the actually measured data of the current measured value iq1. Alternatively, the first correction processing may also be the processing of subjecting the current measured value iq1 to the second correction processing and then dividing the current measured value iq1 by the predetermined value.

The control unit 4 stops rotating the rotor 13 when finding the corrected torque current threshold value (current measured value iq1) exceeding the torque current threshold value Th1 during the mask period Tm1. That is to say, according to this second variation, the rotor 13 may be stopped according to the corrected torque current acquisition value (current measured value iq1) not only from the end of the mask period Tm1 on but also during the mask period Tm1 as well. That is to say, this enables stopping rotating the rotor 13 even when any abnormality such as overload occurs to the electric tool system 1 during the mask period Tm1.

Other Variations of the Embodiment

Next, other variations of the embodiment described above will be enumerated one after another. Optionally, the variations to be described below may be adopted in combination as appropriate. Alternatively, any of the variations to be described below may be combined as appropriate with any of the variations described above.

The functions performed by the electric tool system 1 may also be implemented as, for example, a method of using the electric tool system 1, a (computer) program, or a non-transitory storage medium that stores the program thereon.

A first method of using the electric tool system 1 according to an aspect includes a first acquisition step, a second acquisition step, and a command value generation step. The first acquisition step includes acquiring a value related to a torque current flowing through the motor 15. The second acquisition step includes acquiring a value related to acceleration of the rotor 13. The command value generation step includes calculating, based on a torque current acquisition value (current measured value iq1) and an acceleration acquisition value α1, at least one of a command value ciq1 of the torque current to be supplied to the motor 15 or a command value cid1 of an excitation current to be supplied to the motor 15. The torque current acquisition value (current measured value iq1) is the value related to the torque current as acquired in the first acquisition step. The acceleration acquisition value α1 is the value related to the acceleration as acquired in the second acquisition step.

A second method of using the electric tool system 1 according to another aspect includes a first acquisition step, a second acquisition step, and a correction step. The first acquisition step includes acquiring a value related to a torque current flowing through the motor 15. The second acquisition step includes acquiring a value related to acceleration of the rotor 13. The correction step includes making correction to a torque current acquisition value (current measured value iq1) based on an acceleration acquisition value α1. The torque current acquisition value (current measured value iq1) is the value related to the torque current as acquired in the first acquisition step. The acceleration acquisition value α1 is the value related to the acceleration as acquired in the second acquisition step.

Figure 5:
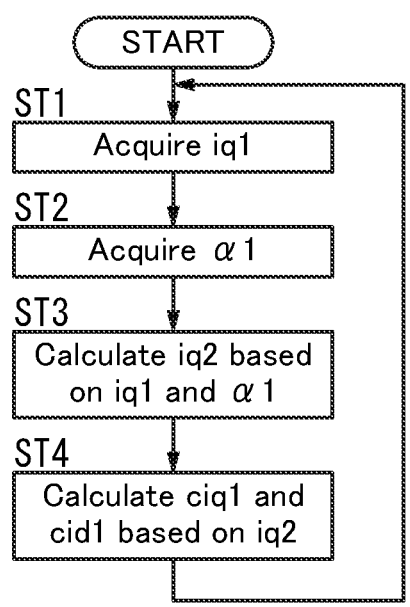
FIG. 5 is a flowchart showing a method of using the electric tool system.

The electric tool system 1 according to the embodiment described above performs the first and second methods of using the electric tool system 1 described above. Specifically, as shown in FIG. 5, the first acquisition unit 60 acquires the current measured value iq1 (in a first acquisition step ST1) and the second acquisition unit 47 acquires the acceleration acquisition value α1 (in a second acquisition step ST2). Next, the correction unit 41 corrects the current measured value iq1 based on the acceleration acquisition value α1. That is to say, the correction unit 41 calculates the corrected torque current iq2 as a corrected value (in a correction step ST3). Next, the calculation unit 42 calculates, based on at least the corrected torque current iq2, the command value ciq1 of the torque current and the command value cid1 of the excitation current (in step ST4). The command values ciq1, cid1 are used to control the motor 15. While the electric tool system 1 is operating, the series of processing steps from the first acquisition step ST1 through the step ST4 are performed repeatedly and the command values ciq1, cid1 are updated.

The series of processing steps from the correction step ST3 through the step ST4 corresponds to the command value generation step of the first method of using the electric tool system 1. That is to say, in the command value generation step, the command value generation unit 40 receives the current measured value iq1 and the acceleration acquisition value α1 and calculates the command value ciq1 of the torque current and the command value cid1 of the excitation current.

A program according to still another aspect is designed to cause one or more processors to perform the method of using the electric tool system 1 according to any of the two aspects described above.

The electric tool system 1 according to the present disclosure includes a computer system. The computer system may include, as principal hardware components, a processor and a memory. Some of the functions of the electric tool system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the electric tool system 1 are integrated together in a single housing. However, this is not an essential configuration for electric tool system 1. Alternatively, those constituent elements of the electric tool system 1 may be distributed in multiple different housings. Still alternatively, at least some functions of the electric tool system 1 (e.g., some functions of the command value generation unit 40) may be implemented as a cloud computing system as well.

The command value generation unit 40 may include the calculation unit 42 but may include no correction unit 41. That is to say, the command value generation unit 40 does not have to correct the current measured value iq1 (torque current acquisition value). The command value generation unit 40 (calculation unit 42) may calculate, based on at least the current measured value iq1 and the acceleration acquisition value α1, at least one of the torque current command value ciq1 or the excitation current command value cid1 without calculating the corrected torque current iq2. This may speed up the processing of calculating at least one of the torque current command value ciq1 or the excitation current command value cid1 compared to a situation where the correction unit 41 calculates the corrected torque current iq2.

Alternatively, the command value generation unit 40 may include the correction unit 41 but may include no calculation unit 42. The command value generation unit 40 may output the corrected torque current iq2, obtained by the correction unit 41, to a constituent element outside of the electric tool system 1.

The control of the motor 15 based on the corrected torque current iq2 does not have to be the control of stopping rotating the rotor 13 when the corrected torque current iq2 exceeds the torque current threshold value Th1. Alternatively, the control unit 4 may, for example, increase or decrease the number of revolutions of the rotor 13 according to a predetermined condition about the corrected torque current iq2.

In the embodiment described above, the relationship between the variation per unit time in the number of revolutions of the rotor 13 and the current measured value iq1 is linearly approximated as expressed by Equation (1). However, this is only an example and should not be construed as limiting. Alternatively, the linear approximation may be replaced by, for example, polynomial approximation, exponential approximation, logarithmic approximation, or power approximation.

In the embodiment described above, the acceleration acquisition value α1 is an angular acceleration. However, this is only an example and should not be construed as limiting. The acceleration acquisition value α1 may also be an acceleration or a second derivative of the number of revolutions.

Also, in the embodiment described above, the acceleration acquisition value α1 is a measured value related to the acceleration of the rotor 13. However, this is only an example and should not be construed as limiting. Alternatively, the acceleration acquisition value α1 may also be a command value related to the acceleration of the rotor 13. Still alternatively, the acceleration acquisition value α1 may also be obtained based on the measured value of the velocity of the rotor 13 and the command value of the velocity of the rotor 13.

The correction unit 41 may correct the current measured value iq1 (torque current acquisition value) based on not only the acceleration acquisition value α1 but also the number of revolutions or angular velocity of the rotor 13. For example, each of the coefficients of Equation (1) may be varied according to the number of revolutions or the magnitude of the angular velocity of the rotor 13.

In the embodiment described above, the second acquisition unit 47 is configured to acquire the acceleration acquisition value α1 by calculating the acceleration acquisition value α1 by itself. However, this configuration is only an example and should not be construed as limiting. Alternatively, the second acquisition unit 47 may also be configured to acquire the acceleration acquisition value α1 from another constituent element.

The control unit 4 does not have to stop rotating the rotor 13 immediately on finding the corrected torque current iq2 exceeding the torque current threshold value Th1 but may stop rotating the rotor 13 after a predetermined standby time has passed. Alternatively, the control unit 4 may stop rotating the rotor 13 when the state where the corrected torque current iq2 is greater than the torque current threshold value Th1 lasts for a predetermined decision time.

The parameters for use in correction by the correction unit 41 may be changeable. The parameters for use in correction may be, for example, the respective coefficients of Equation (1). The relationship expressed by Equation (1) (i.e., the relationship between the variation per unit time in the number of revolutions of the rotor 13 and the current measured value iq1) may vary according to, for example, the specifications of the motor 15 and the deterioration of the motor 15 with time. Thus, the respective coefficients of Equation (1) may be changed according to the variation of the relationship. The parameters may be changed in accordance with the user's operating command entered through a user interface included in the electric tool system 1. Alternatively, the correction unit 41 may automatically change the parameters according to, for example, the number of years of use of the motor 15.

The command value generation unit 40 may use, as the torque current acquisition value, the command value ciq1 instead of the current measured value iq1.

(Recapitulation)

The embodiment and its variations described above may be specific implementations of the following aspects of the present disclosure.

An electric tool system (1) according to a first aspect includes a motor (15), a control unit (4), and an output shaft (21). The motor (15) includes a stator (14) and a rotor (13). The rotor (13) rotates with respect to the stator (14). The control unit (4) performs vector control on the motor (15). The output shaft (21) is to be coupled to a tip tool (28). The control unit (4) includes a first acquisition unit (60), a second acquisition unit (47), and a command value generation unit (40). The first acquisition unit (60) acquires a value related to a torque current flowing through the motor (15). The second acquisition unit (47) acquires a value related to acceleration of the rotor (13). The command value generation unit (40) calculates, based on a torque current acquisition value (current measured value iq1) and an acceleration acquisition value ($\alpha$1), at least one of a command value (ciq1) of the torque current to be supplied to the motor (15) or a command value (cid1) of an excitation current to be supplied to the motor (15). The torque current acquisition value (current measured value iq1) is the value related to the torque current as acquired by the first acquisition unit (60). The acceleration acquisition value ($\alpha$1) is the value related to the acceleration as acquired by the second acquisition unit (47).

This configuration enables controlling the motor (15) more accurately, compared to a situation where the command value generation unit (40) calculates at least one of the command value (ciq1) of the torque current or the command value (cid1) of the excitation current without using the acceleration acquisition value ($\alpha$1).

In an electric tool system (1) according to a second aspect, which may be implemented in conjunction with the first aspect, the command value generation unit (40) includes a correction unit (41) and a calculation unit (42). The correction unit (41) makes correction to the torque current acquisition value (current measured value iq1) based on the acceleration acquisition value ($\alpha$1). The calculation unit (42) calculates, based on the torque current acquisition value, at least one of the command value (ciq1) of the torque current to be supplied to the motor (15) or the command value (cid1) of the excitation current to be supplied to the motor (15) in a state where the correction made by the correction unit (41) is reflected.

This configuration enables controlling the motor (15) more accurately by making correction to the torque current acquisition value (current measured value iq1).

In an electric tool system (1) according to a third aspect, which may be implemented in conjunction with the first or second aspect, the command value generation unit (40) includes a correction unit (41). The correction unit (41) makes, based on the acceleration acquisition value ($\alpha$1), correction to at least one of the torque current acquisition value (current measured value iq1) or a predetermined torque current threshold value (Th1). The control unit (4) stops rotating the rotor (13) when finding the torque current acquisition value exceeding the torque current threshold value in a state where the correction made by the correction unit (41) is reflected.

This configuration may reduce the chances of excessive torque being applied to the output shaft (21).

In an electric tool system (1) according to a fourth aspect, which may be implemented in conjunction with any one of the first to third aspects, the control unit (4) processes, as invalid information for at least a part of control of the motor (15), the torque current acquisition value (current measured value iq1) in an interval from a point in time when the rotor (13) starts to rotate through a point in time when a predetermined mask period (Tm1) passes.

This configuration may reduce control errors of the motor (15) during the mask period (Tm1).

In an electric tool system (1) according to a fifth aspect, which may be implemented in conjunction with any one of the first to third aspects, the command value generation unit (40) calculates, based on the torque current acquisition value (current measured value iq1) and the acceleration acquisition value ($\alpha$1), at least one of the command value (ciq1) of the torque current to be supplied to the motor (15) or the command value (cid1) of the excitation current to be supplied to the motor (15) at least in an interval from a point in time when the rotor (13) starts to rotate through a point in time when a predetermined period (mask period Tm1) passes.

This configuration enables controlling the motor (15) more accurately during the predetermined period (mask period Tm1).

In an electric tool system (1) according to a sixth aspect, which may be implemented in conjunction with any one of the first to fifth aspects, the second acquisition unit (47) calculates the acceleration acquisition value ($\alpha$1) based on a physical quantity proportional to a number of revolutions of the rotor (13).

This configuration enables calculating the acceleration acquisition value ($\alpha$1) accurately.

Note that the constituent elements according to the second to sixth aspects are not essential constituent elements for the electric tool system (1) but may be omitted as appropriate.

An electric tool system (1) according to a seventh aspect includes a motor (15), a control unit (4), and an output shaft (21). The motor (15) includes a stator (14) and a rotor (13). The rotor (13) rotates with respect to the stator (14). The control unit (4) performs vector control on the motor (15). The output shaft (21) is to be coupled to a tip tool (28). The control unit (4) includes a first acquisition unit (60), a second acquisition unit (47), and a correction unit (41). The first acquisition unit (60) acquires a value related to a torque current flowing through the motor (15). The second acquisition unit (47) acquires a value related to acceleration of the rotor (13). The correction unit (41) makes correction to a torque current acquisition value (current measured value iq1) based on an acceleration acquisition value ($\alpha$1). The torque current acquisition value (current measured value iq1) is the value related to the torque current as acquired by the first acquisition unit (60). The acceleration acquisition value (α1) is the value related to the acceleration as acquired by the second acquisition unit (47).

This configuration enables controlling the motor (15) more accurately, compared to a situation where the correction unit (41) makes no correction to the torque current acquisition value (current measured value iq1).

The configuration according to the seventh aspect may be combined as appropriate with the configuration according to any one of the first to sixth aspects.

A method of using an electric tool system (1) according to an eighth aspect is a method of using an electric tool system (1) including a motor (15), a control unit (4), and an output shaft (21). The motor (15) includes a stator (14) and a rotor (13). The rotor (13) rotates with respect to the stator (14). The control unit (4) performs vector control on the motor (15). The output shaft (21) is to be coupled to a tip tool (28). The method of using the electric tool system (1) includes a first acquisition step, a second acquisition step, and a command value generation step. The first acquisition step includes acquiring a value related to a torque current flowing through the motor (15). The second acquisition step includes acquiring a value related to acceleration of the rotor (13). The command value generation step includes calculating, based on a torque current acquisition value (current measured value iq1) and an acceleration acquisition value (α1), at least one of a command value (ciq1) of the torque current to be supplied to the motor (15) or a command value (cid1) of an excitation current to be supplied to the motor (15). The torque current acquisition value (current measured value iq1) is the value related to the torque current as acquired in the first acquisition step. The acceleration acquisition value (α1) is the value related to the acceleration as acquired in the second acquisition step.

This method enables controlling the motor (15) more accurately, compared to a situation where the command value generation step includes calculating at least one of the command value (ciq1) of the torque current or the command value (cid1) of the excitation current without using the acceleration acquisition value (α1).

A method of using an electric tool system (1) according to a ninth aspect is a method of using an electric tool system (1) including a motor (15), a control unit (4), and an output shaft (21). The motor (15) includes a stator (14) and a rotor (13). The rotor (13) rotates with respect to the stator (14). The control unit (4) performs vector control on the motor (15). The output shaft (21) is to be coupled to a tip tool (28). The method of using the electric tool system (1) includes a first acquisition step, a second acquisition step, and a correction step. The first acquisition step includes acquiring a value related to a torque current flowing through the motor (15). The second acquisition step includes acquiring a value related to acceleration of the rotor (13). The correction step includes making correction to a torque current acquisition value (current measured value iq1) based on an acceleration acquisition value (α1). The torque current acquisition value (current measured value iq1) is the value related to the torque current as acquired in the first acquisition step. The acceleration acquisition value (α1) is the value related to the acceleration as acquired in the second acquisition step.

This method enables controlling the motor (15) more accurately, compared to a situation where the correction step includes making no correction to the torque current acquisition value (current measured value iq1).

A program according to a tenth aspect is designed to cause one or more processors to perform the method of using the electric tool system (1) according to the eighth or ninth aspect.

This program enables controlling the motor (15) more accurately.

Note that these are not the only aspects of the present disclosure. Rather, various configurations (including variations) of the electric tool system (1) according to the exemplary embodiment described above may also be implemented as a method or a program.

REFERENCE SIGNS LIST

1 Electric Tool System
4 Control Unit
13 Rotor
14 Stator
15 Motor
21 Output Shaft
28 Tip Tool
40 Command Value Generation Unit
41 Correction Unit
42 Calculation Unit
47 Second Acquisition Unit
60 First Acquisition Unit
iq1 Current Measured Value (Torque Current Acquisition Value)
ciq1 Command Value of Torque Current
cid1 Command Value of Excitation Current
Th1 Torque Current Threshold Value
Tm1 Mask Period (Predetermined Period)
α1 Acceleration Acquisition Value

The invention claimed is:

1. An electric tool system comprising:
a motor including a stator and a rotor, the rotor being configured to rotate with respect to the stator;
a control unit configured to perform vector control on the motor; and
an output shaft configured to be coupled to a tip tool,
the control unit including:
a first acquisition unit configured to acquire a value related to a torque current flowing through the motor;
a second acquisition unit configured to acquire a value related to acceleration of the rotor; and
a command value generation unit configured to calculate, based on a torque current acquisition value and an acceleration acquisition value, at least one of a command value of the torque current to be supplied to the motor or a command value of an excitation current to be supplied to the motor, the torque current acquisition value being the value related to the torque current as acquired by the first acquisition unit, the acceleration acquisition value being the value related to the acceleration as acquired by the second acquisition unit,
the command value generation unit including:
a correction unit configured to make correction to the torque current acquisition value based on the acceleration acquisition value; and
a calculation unit configured to calculate, based on the torque current acquisition value, the at least one of the command value of the torque current to be supplied to the motor or the command value of the excitation current to be supplied to the motor in a state where the correction made by the correction unit is reflected.

2. The electric tool system of claim 1, wherein
the command value generation unit is configured to calculate, based on the torque current acquisition value and the acceleration acquisition value, the at least one of the command value of the torque current to be supplied to the motor or the command value of the excitation current to be supplied to the motor at least in an interval from a point in time when the rotor starts to rotate through a point in time when a predetermined period passes.

3. The electric tool system of claim 1, wherein
the second acquisition unit is configured to calculate the acceleration acquisition value based on a physical quantity proportional to a number of revolutions of the rotor.

4. A method of using the electric tool system of claim 1, the method comprising:
   a first acquisition step including acquiring the value related to the torque current flowing through the motor;
   a second acquisition step including acquiring the value related to the acceleration of the rotor; and
   a command value generation step including calculating, based on the torque current acquisition value and the acceleration acquisition value, the at least one of the command value of the torque current to be supplied to the motor or the command value of the excitation current to be supplied to the motor, the torque current acquisition value being the value related to the torque current as acquired in the first acquisition step, the acceleration acquisition value being the value related to the acceleration as acquired in the second acquisition step,
   the command value generation step including:
      a correction step including making correction to the torque current acquisition value based on the acceleration acquisition value; and
      a calculation step including calculating, based on the torque current acquisition value, the at least one of the command value of the torque current to be supplied to the motor or the command value of the excitation current to be supplied to the motor in a state where the correction made by the correction step is reflected.

5. A non-transitory computer-readable storage medium having stored thereon a program designed to cause one or more processors of the computer to perform the method of using the electric tool system according to claim 4.

6. An electric tool system comprising:
   a motor including a stator and a rotor, the rotor being configured to rotate with respect to the stator;
   a control unit configured to perform vector control on the motor; and
   an output shaft configured to be coupled to a tip tool,
   the control unit including:
      a first acquisition unit configured to acquire a value related to a torque current flowing through the motor;
      a second acquisition unit configured to acquire a value related to acceleration of the rotor; and
      a command value generation unit configured to calculate, based on a torque current acquisition value and an acceleration acquisition value, at least one of a command value of the torque current to be supplied to the motor or a command value of an excitation current to be supplied to the motor, the torque current acquisition value being the value related to the torque current as acquired by the first acquisition unit, the acceleration acquisition value being the value related to the acceleration as acquired by the second acquisition unit,
   the command value generation unit including a correction unit configured to make, based on the acceleration acquisition value, correction to at least one of the torque current acquisition value or a predetermined torque current threshold value, and
   the control unit being configured to stop rotating the rotor when finding the torque current acquisition value exceeding the torque current threshold value in a state where the correction made by the correction unit is reflected.

7. A method of using the electric tool system of claim 6, the method comprising:
   a first acquisition step including acquiring the value related to the torque current flowing through the motor;
   a second acquisition step including acquiring the value related to the acceleration of the rotor; and
   a command value generation step including calculating, based on the torque current acquisition value and the acceleration acquisition value, the at least one of the command value of the torque current to be supplied to the motor or the command value of the excitation current to be supplied to the motor, the torque current acquisition value being the value related to the torque current as acquired in the first acquisition step, the acceleration acquisition value being the value related to the acceleration as acquired in the second acquisition step,
   the command value generation step including a correction step including making, based on the acceleration acquisition value, correction to the at least one of the torque current acquisition value or a predetermined torque current threshold value, and
   the control step including stopping rotating the rotor when finding the torque current acquisition value exceeding the torque current threshold value in a state where the correction made by the correction step is reflected.

8. A non-transitory computer-readable storage medium having stored thereon a program designed to cause one or more processors of the computer to perform the method of using the electric tool system according to claim 7.

9. An electric tool system comprising:
   a motor including a stator and a rotor, the rotor being configured to rotate with respect to the stator;
   a control unit configured to perform vector control on the motor; and
   an output shaft configured to be coupled to a tip tool,
   the control unit including:
      a first acquisition unit configured to acquire a value related to a torque current flowing through the motor;
      a second acquisition unit configured to acquire a value related to acceleration of the rotor; and
      a command value generation unit configured to calculate, based on a torque current acquisition value and an acceleration acquisition value, at least one of a command value of the torque current to be supplied to the motor or a command value of an excitation current to be supplied to the motor, the torque current acquisition value being the value related to the torque current as acquired by the first acquisition unit, the acceleration acquisition value being the value related to the acceleration as acquired by the second acquisition unit,
   the control unit being configured to process, as invalid information for at least a part of control of the motor, the torque current acquisition value in an interval from a point in time when the rotor starts to rotate through a point in time when a predetermined mask period passes.

10. A method of using the electric tool system of claim 9, the method comprising:
- a first acquisition step including acquiring the value related to the torque current flowing through the motor;
- a second acquisition step including acquiring the value related to the acceleration of the rotor; and
- a command value generation step including calculating, based on the torque current acquisition value and the acceleration acquisition value, the at least one of the command value of the torque current to be supplied to the motor or the command value of the excitation current to be supplied to the motor, the torque current acquisition value being the value related to the torque current as acquired in the first acquisition step, the acceleration acquisition value being the value related to the acceleration as acquired in the second acquisition step,
- the control step including processing, as invalid information for at least a part of control of the motor, the torque current acquisition value in an interval from a point in time when the rotor starts to rotate through a point in time when a predetermined mask period passes.

11. A non-transitory computer-readable storage medium having stored thereon a program designed to cause one or more processors of the computer to perform the method of using the electric tool system according to claim 10.

* * * * *